US011126242B2

(12) United States Patent
Shaikh et al.

(10) Patent No.: US 11,126,242 B2
(45) Date of Patent: Sep. 21, 2021

(54) TIME VARYING POWER MANAGEMENT WITHIN DATACENTERS

(71) Applicant: Virtual Power Systems, Inc., Milpitas, CA (US)

(72) Inventors: Karimulla Raja Shaikh, Cupertino, CA (US); Clark A. Jeria Frias, San Jose, CA (US); Martin P Leslie, San Jose, CA (US)

(73) Assignee: Virtual Power Systems, Inc., Milpitas, CA (US)

( * ) Notice: Subject to any disclaimer, the term of this patent is extended or adjusted under 35 U.S.C. 154(b) by 122 days.

(21) Appl. No.: 16/402,324

(22) Filed: May 3, 2019

(65) Prior Publication Data

US 2019/0258307 A1 Aug. 22, 2019

Related U.S. Application Data

(63) Continuation-in-part of application No. 15/381,049, filed on Dec. 15, 2016, now Pat. No. 10,747,289, (Continued)

(51) Int. Cl.
*G06F 1/3228* (2019.01)
*G06F 1/3209* (2019.01)
(Continued)

(52) U.S. Cl.
CPC .......... *G06F 1/3228* (2013.01); *G06F 1/3209* (2013.01); *G05B 13/041* (2013.01); *G06F 1/3203* (2013.01)

(58) Field of Classification Search
CPC ... G05B 13/041; G06F 1/3209; G06F 1/3228; G06F 1/3203
See application file for complete search history.

(56) References Cited

U.S. PATENT DOCUMENTS 6,396,170 B1 5/2002 Laufenberg et al.
6,967,283 B2 11/2005 Rasmussen et al.
(Continued)

FOREIGN PATENT DOCUMENTS

EP 2372861 B1 10/2011
JP 2009232521 A 10/2009
(Continued)

OTHER PUBLICATIONS

Metcalf, Jeffrey, "Power Efficiency Comparison: Cisco UCS® 5108 Blade Server Chassis and HP BladeSystem® c7000 Enclosure", Copyright Sep. 2013, Cisco.
(Continued)

*Primary Examiner* — Terrell S Johnson
(74) *Attorney, Agent, or Firm* — Adams Intellex, PLC

(57) ABSTRACT

Disclosed techniques include time-varying power management within datacenters. A set of power policies for managing power within a datacenter is obtained. The set of policies varies over time. A priority is determined for a policy within the set of policies for managing the power within the datacenter. The policy within the set varies over time. A situation within the datacenter is identified where the situation matches that described in the policy within the set of policies. A power arrangement within the datacenter is modified based on the policy within the set of policies. The power arrangement within the datacenter applies to a section of the datacenter including one or more IT racks. The modifying includes powering a set of loads within the datacenter by a specific power source, changing a topology within the datacenter, powering down a portion of the datacenter, or changing a service level agreement support level.

29 Claims, 10 Drawing Sheets

Related U.S. Application Data which is a continuation-in-part of application No. 14/526,140, filed on Oct. 28, 2014, now Pat. No. 10,128,684.

(60) Provisional application No. 62/666,773, filed on May 4, 2018, provisional application No. 62/267,961, filed on Dec. 16, 2015, provisional application No. 61/896,504, filed on Oct. 28, 2013, provisional application No. 61/931,667, filed on Jan. 26, 2014, provisional application No. 61/970,390, filed on Mar. 26, 2014, provisional application No. 61/985,617, filed on Apr. 29, 2014, provisional application No. 62/029,226, filed on Jul. 25, 2014, provisional application No. 62/033,618, filed on Aug. 5, 2014, provisional application No. 62/047,593, filed on Sep. 8, 2014, provisional application No. 62/057,127, filed on Sep. 29, 2014.

(51) Int. Cl.
G05B 13/04 (2006.01)
G06F 1/3203 (2019.01)

(56) References Cited

U.S. PATENT DOCUMENTS

| | | | |
|---|---|---|---|
| 7,236,896 B2 | 6/2007 | Farkas et al. | |
| 8,067,857 B2 | 11/2011 | Humphrey et al. | |
| 8,193,662 B1 | 6/2012 | Carlson et al. | |
| 8,464,080 B2 | 6/2013 | Archibald et al. | |
| 8,527,619 B2 | 9/2013 | Ewing et al. | |
| 8,595,379 B1 | 11/2013 | Brandwine | |
| 8,700,929 B1 | 4/2014 | Weber et al. | |
| 8,856,576 B2 | 10/2014 | Stanley-Marbell | |
| 8,958,923 B2 | 2/2015 | Kake et al. | |
| 9,377,837 B2 | 6/2016 | Ghose | |
| 9,641,025 B2 | 5/2017 | Agrawal et al. | |
| 9,865,998 B1 | 1/2018 | Emert et al. | |
| 9,871,408 B2 | 1/2018 | Narita | |
| 2003/0056125 A1 | 3/2003 | O'Conner et al. | |
| 2005/0071092 A1 | 3/2005 | Farkas et al. | |
| 2005/0162019 A1 | 7/2005 | Masciarelli et al. | |
| 2006/0082222 A1 | 4/2006 | Pincu et al. | |
| 2007/0216229 A1 | 9/2007 | Johnson, Jr. et al. | |
| 2008/0067872 A1 | 3/2008 | Moth | |
| 2008/0178029 A1* | 7/2008 | McGrane | G06F 1/3246 713/324 |
| 2008/0320322 A1 | 12/2008 | Green et al. | |
| 2009/0144568 A1 | 6/2009 | Fung | |
| 2009/0235097 A1* | 9/2009 | Hamilton | G06F 1/3203 713/320 |
| 2010/0037070 A1 | 2/2010 | Brumley et al. | |
| 2010/0037225 A1 | 2/2010 | Doyle et al. | |
| 2010/0058092 A1 | 3/2010 | Bougaev et al. | |
| 2010/0077238 A1 | 3/2010 | Vogman et al. | |
| 2010/0102633 A1 | 4/2010 | Seaton | |
| 2010/0205469 A1 | 8/2010 | McCarthy et al. | |
| 2010/0211810 A1 | 8/2010 | Nacho | |
| 2010/0264741 A1 | 10/2010 | Togare | |
| 2010/0328849 A1 | 12/2010 | Ewing et al. | |
| 2011/0133559 A1 | 6/2011 | Yamashita et al. | |
| 2011/0187193 A1* | 8/2011 | Pan | H02J 3/14 307/39 |
| 2011/0245988 A1 | 10/2011 | Ingels et al. | |
| 2011/0264937 A1 | 10/2011 | Meisner et al. | |
| 2011/0302432 A1 | 12/2011 | Harris et al. | |
| 2011/0304211 A1 | 12/2011 | Peterson et al. | |
| 2012/0054512 A1 | 3/2012 | Archibald et al. | |
| 2012/0066519 A1 | 3/2012 | El-Essawy et al. | |
| 2012/0303993 A1 | 11/2012 | Nishtala et al. | |
| 2013/0020868 A1* | 1/2013 | Wu | H02J 13/00004 307/18 |
| 2015/0057821 A1 | 2/2015 | Nasle | |
| 2015/0378408 A1 | 12/2015 | Kaplan | |
| 2015/0380968 A1 | 12/2015 | Lee | |
| 2016/0020609 A1 | 1/2016 | Carrasco et al. | |
| 2016/0209901 A1 | 7/2016 | Wilcox et al. | |
| 2016/0320825 A1 | 11/2016 | Panda et al. | |
| 2017/0005515 A1 | 1/2017 | Sanders | |
| 2017/0025876 A1 | 1/2017 | Chan | |
| 2017/0177047 A1 | 6/2017 | Fluman et al. | |
| 2017/0201425 A1 | 7/2017 | Marinelli et al. | |
| 2017/0322241 A1 | 11/2017 | Tang et al. | |
| 2018/0052503 A1* | 2/2018 | Sharma | H02J 3/381 |
| 2019/0122132 A1 | 4/2019 | Rimini et al. | |

FOREIGN PATENT DOCUMENTS

| | | | |
|---|---|---|---|
| KR | WO2012091323 A2 | 7/2012 | |
| WO | WO2011119444 A2 | 9/2011 | |

OTHER PUBLICATIONS

"VMware® Distributed Power Management Concepts and Use", White Paper, Copyright 2010 VMware, Inc., 3401 Hillview Avenue Palo Alto CA 94304 USA.

Mammano, Bob, "Load Sharing with Paralleled Power Supplies", Copyright 2001, Texas Instruments Incorporated, Dallas, Texas.

Muccini, Mark, el al., "Power Consumption Reduction: Hot Spare", A Dell technical white paper, Feb. 2012, Rev. 1.0, Dell, Inc.

Meisner, David, Brian T. Gold, and Thomas F. Wenisch. "PowerNap: eliminating server idle power." ACM SIGARCH Computer Architecture News 37.1 (2009): 205-216.

International Search Report dated Feb. 9, 2015 for PCT/US2014/062650.

International Search Report dated Jan. 30, 2015 for PCT/US2014/062684.

\* cited by examiner

|   | Local State 410 | | | | Delay 412 | | Actions 414 | | | | |
|---|---|---|---|---|---|---|---|---|---|---|---|
| Disconnect Time | Feed A | Feed B | Feed C | State of Charge Local Storage | Delay | Reset Threshold | Output A' | Output B' | Limit A | Limit B | Feed C |
| 0 | 1 | 1 | 1 | 90 | 0 | 0 | 1 | 1 | 2500 | 2500 | -400 |
| 0 | 1 | 0 | 1 | 100 | 0 | 0 | 1 | 0 | | | |
| 0 | 0 | 1 | 1 | 100 | 0 | 0 | 0 | 1 | | | |
| 0 | 0 | 0 | 1 | 100 | 0 | 0 | 0 | 0 | | | |
| 0 | 0 | 0 | 0 | 100 | 0 | 0 | 0 | 0 | | | |

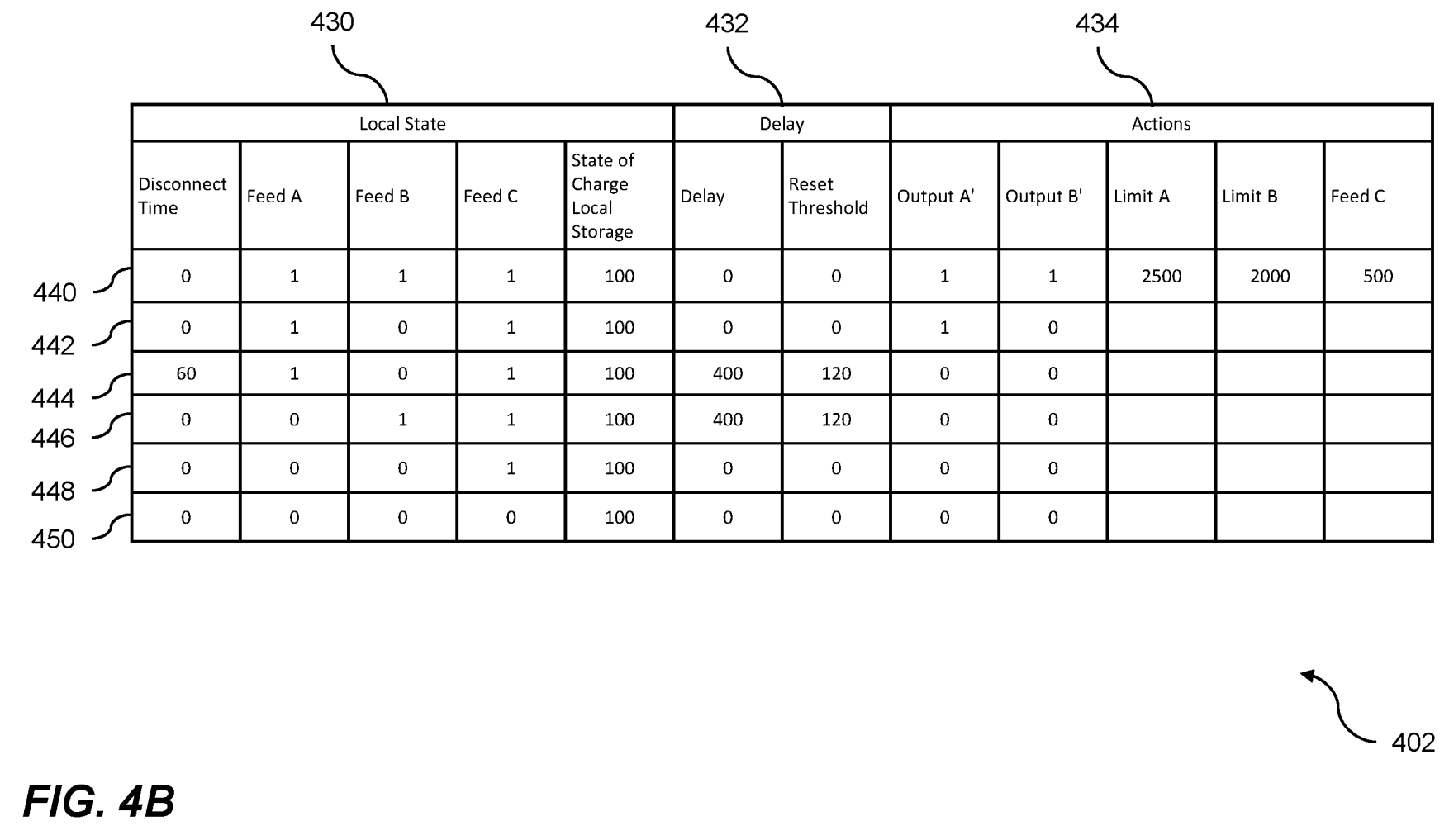

|   | Local State | | | | Delay | | Actions | | | | |
|---|---|---|---|---|---|---|---|---|---|---|---|
| Disconnect Time | Feed A | Feed B | Feed C | State of Charge Local Storage | Delay | Reset Threshold | Output A' | Output B' | Limit A | Limit B | Feed C |
| 0 | 1 | 1 | 1 | 100 | 0 | 0 | 1 | 1 | 2500 | 2000 | 500 |
| 0 | 1 | 0 | 1 | 100 | 0 | 0 | 1 | 0 | | | |
| 60 | 1 | 0 | 1 | 100 | 400 | 120 | 0 | 0 | | | |
| 0 | 0 | 1 | 1 | 100 | 400 | 120 | 0 | 0 | | | |
| 0 | 0 | 0 | 1 | 100 | 0 | 0 | 0 | 0 | | | |
| 0 | 0 | 0 | 0 | 100 | 0 | 0 | 0 | 0 | | | |

*FIG. 4B*

TIME VARYING POWER MANAGEMENT WITHIN DATACENTERS

RELATED APPLICATIONS

This application claims the benefit of U.S. provisional patent application "Time Varying Power Management within Datacenters" Ser. No. 62/666,773, filed May 4, 2018.

This application is also a continuation-in-part of U.S. patent application "Data Center Power Manipulation" Ser. No. 15/381,049, filed Dec. 15, 2016, which claims the benefit of U.S. provisional patent application "Energy Control by Peak Shaving and Source Pooling" Ser. No. 62/267,961, filed Dec. 16, 2016.

The patent application "Data Center Power Manipulation" Ser. No. 15/381,049, filed Dec. 15, 2016, is also a continuation-in-part of U.S. patent application "Energy Control Via Power Requirement Analysis and Power Source Enablement" Ser. No. 14/526,140, filed Oct. 28, 2014, which claims the benefit of U.S. provisional patent applications "Intelligent Control of Energy and Power Management" Ser. No. 61/896,504, filed Oct. 28, 2013, "Intelligent Power Control" Ser. No. 61/931,667, filed Jan. 26, 2014, "Dynamic Power Control Through Resource Allocation" Ser. No. 61/970,390, filed Mar. 26, 2014, "Dynamic Power Capacity Allocation" Ser. No. 61/985,617, filed Apr. 29, 2014, "Multi-Level Data Center Consolidated Power Control" Ser. No. 62/029,226, filed Jul. 25, 2014, "Multi-Level Dynamic Power Control Through Capacity Allocation" Ser. No. 62/033,618, filed Aug. 5, 2014, "Energy Control Via Power Requirement Analysis and Power Source Enablement" Ser. No. 62/047,593, filed Sep. 8, 2014, and "Intelligent Control Of Energy For Rack Level Consolidated Power Systems" Ser. No. 62/057,127, filed Sep. 29, 2014.

Each of the foregoing applications is hereby incorporated by reference in its entirety.

FIELD OF ART

This application relates generally to power management and more particularly to time-varying power management within datacenters.

BACKGROUND

Organizations such as search providers, online retailers, financial institutions, research laboratories, universities, health care providers, and other computing-intensive organizations frequently conduct processing operations from large-scale computing facilities, sometimes referred to as datacenters or, more colloquially, "server farms." The datacenter houses a network of varied, mission-critical systems, all of which are vital to the operation of the organization. The organization uses the datacenter to perform computational operations and to store, process, manage, and disseminate data which is valuable to a variety of business units and departments within the organization. The top priorities for the organization are ensuring uninterrupted operation of the datacenter and protecting the security and reliability of the information resources. Further, datacenters have large and highly fluctuating power requirements. Some of the systems in the datacenter have more stringent power and availability requirements than do other systems. Thus, deployment of equipment within a datacenter, including the physical location of the equipment, can be critical. Datacenters can house many rows of data racks that contain servers, storage devices, routers, backup equipment, communications units, and other IT equipment.

The amount of power demanded of and allocated to the data racks is often very high. This power generation produces heat, which makes cooling of the racks and the datacenter facility a critical concern. Further, the power demand for both industrial applications and datacenters typically fluctuates based on specific business factors, such as the processing job mix and the time of day, month, or season. Thus, managing power, space, and cooling becomes a principal aspect of many industrial applications, including datacenter administration. Furthermore, any energy savings achieved in the datacenter can directly translate into increased profit margins for an organization. Energy savings can also provide additional dividends in terms of reduced wear and tear on power sources and reduced cooling costs, adding to the received benefits of an organization.

The computer systems within the datacenter typically include a large number of components that consume power. Such components include printed circuit boards, mass storage devices, networking interfaces, and processors. Given the precise and ever-increasing power requirements demanded by these components, reliable and efficient power delivery is crucial for successful operation of such server farms. For some data processing applications, the reliability and availability requirements of the datacenter infrastructure must meet or exceed predetermined statutory requirements, such as those requirements mandated for many financial institutions. Further, other statutory requirements demand that specific standards be met to ensure the protection of personal data for customers of financial institutions, healthcare organizations, educational organizations, and retail organizations. The statutory requirements place stringent safeguards on the physical and technical security of personal data, and exact penalties if the safeguards are not met.

Datacenter design decisions such as levels of system availability, reliability, and job load, plus many others, direct that additional infrastructure requirements be met. One particularly challenging design issue that must be addressed is the effective cooling of a data center (i.e. the removal of excess heat). The removal of the excess heat is critical to ensuring stable and reliable operations of the datacenter. Each of the many devices in the data center generates substantial amounts of heat, irrespective of whether the device is a server, a blade server, a switch, a backup unit, a communications unit, or another device. In fact, the issue of cooling modern data centers has become such an important design criterion that cooling needs directly impact the layout and design of the datacenter. Some datacenters are arranged in so-called "hot rows" and "cold rows," where equipment that generates excess heat is grouped together in "hot rows" and is surrounded by rows of cooler-running equipment grouped in "cold rows." The cold rows are named for their ability to serve as heat sinks for the hot rows, absorbing some of the excess heat from the "hot" equipment. Other centers are designed with cooling devices placed adjacent to significantly hot devices, where the cooling devices include fans for air flow, air conditioning units, water cooling systems, and so on. Perhaps the most significant data center design consideration is providing sufficient power to the datacenter. Particularly in the case of high-reliability data centers, power can be provided by more than one power grid to provide redundancy, while for other data centers, power can be provided by a combination of a power grid, a power micro-grid, locally generated power, renewable power, and backup power. Regardless of how the power is supplied to the data center, providing reliable and efficient power to the large number of computers and associated equipment in modern datacenters is the critical design criterion to successful operation of such facilities.

SUMMARY

Power requirements within a data center are generally time-varying in nature. The power requirements derive from the vast range of electrical and electronic equipment within the datacenter, and usually include service level agreements. The power requirements can be based on AC loads and DC loads. The datacenter power requirements can vary over time because of processing application or job mix, planned equipment maintenance, unplanned equipment failure, and other factors. The time-varying power requirements can include power load increases during normal business hours, and subsequent decreases after business hours, on weekends, or during planned shutdowns. The makeup of AC load demand vs. DC load demand can also change. Datacenters provide vital functions for businesses, governments, educational institutions, and other enterprises. Accurately characterizing the behavior of datacenter power consumption is essential to maintaining consistent operational reliability of the datacenters. Time-varying power management supports power requirements within datacenters. The time-varying power management can be based on power policies which can be used to modify power arrangements within the datacenter. Power management can include redundancy such as 1N redundancy, N+1 redundancy, or 2N redundancy; carbon footprint management through the use of renewable energy sources; cost of energy; or source of energy.

The power requirements of a datacenter can fluctuate over time based on a variety of factors. The power requirements depend on the electronic and electrical equipment within the datacenter and can be based on AC loads and DC loads. The factors can include changes over time of the mix and amount of datacenter equipment; changes in positioning of information technology racks; changes in equipment cooling requirements; various processing job mixes; and so on. The power requirement changes can also be based on required application activity, planned maintenance, unplanned equipment failure, etc. Datacenters provide vital functions for businesses, governments, educational institutions, and other enterprises. Managing a scalable datacenter power infrastructure is essential to maintain consistent reliability of the datacenters.

Disclosed techniques include time-varying power management within datacenters. A set of power policies for managing power within a datacenter is obtained. A priority for a policy within the set of policies for managing the power within the datacenter is also determined. A situation within the datacenter is identified, where the situation matches that described in the policy within the set of policies. A power arrangement within the datacenter is modified based on the policy within the set of policies.

A processor-implemented method for power management is disclosed comprising: obtaining a set of power policies for managing power within a datacenter; determining a priority for a policy within the set of policies for managing the power within the datacenter; identifying a situation within the datacenter where the situation matches that described in the policy within the set of policies; and modifying a power arrangement within the datacenter based on the policy within the set of policies. In embodiments, the modifying includes powering a set of loads within the datacenter by a specific power source. In embodiments, the modifying includes changing a topology within the datacenter. In embodiments, the modifying includes powering down a portion of the datacenter, and in embodiments, the powering down occurs after a time duration specified in the policy. In other embodiments, the modifying includes changing a service level agreement support level for power within the datacenter.

Various features, aspects, and advantages of various embodiments will become more apparent from the following further description.

BRIEF DESCRIPTION OF THE DRAWINGS

The following detailed description of certain embodiments may be understood by reference to the following figures wherein:

FIG. 4A illustrates example power policies for 2N redundancy.

FIG. 4B illustrates example power policies for 1N redundancy.

DETAILED DESCRIPTION

This disclosure provides techniques for time-varying power management within datacenters. Managing information technology (IT) tasks, including the efficiency and reliability of power distribution, space allocation, and cooling capacity, is highly challenging. The management of these resources is particularly difficult for datacenters, where the supply of and demand for power must be carefully balanced, analyzed, and anticipated. Some datacenters are dedicated to a single organization, while other datacenters are contracted for use by multiple organizations. Use of a given datacenter by various organizations can be managed based on the amount of equipment a given organization wishes to locate in the datacenter, power load requirements, redundancy requirements for power such as 1N redundancy, N+1 redundancy, or 2N redundancy; service level agreements (SLAs) for the power; power source type, availability, or health; and so on. Datacenter power systems are designed to meet the time-varying power needs of large installations of diverse electrical equipment.

The wide range of electrical equipment that can be located in a datacenter can include devices such as servers, blade servers, communications switches, backup data storage units, communications hardware, AC and DC power distribution hardware, and other devices. The electrical equipment can include one or more of processors; data servers; server racks; and heating, ventilating, and air conditioning (HVAC) units. The HVAC units are installed to manage the prodigious heat that is dissipated by all of the electrical equipment in the datacenter. The power systems receive power from multiple power feeds, where the coupled power feeds can derive from grid power such as hydro, coal, natural gas, nuclear, or other grid power plants; local power generation or "micro-grid" power from micro-hydro, wind, solar, geothermal, tidal, wave action, etc.; diesel generator (DG) sets; and so on. The multiple power feeds, which typically number at least two, provide critical power delivery redundancy to the datacenter power system. That is, if one power feed were to go down or be taken offline for maintenance, then another power feed is available to provide the time-varying power needed to drive the power loads of large equipment installations, such as datacenters.

Figure 1:
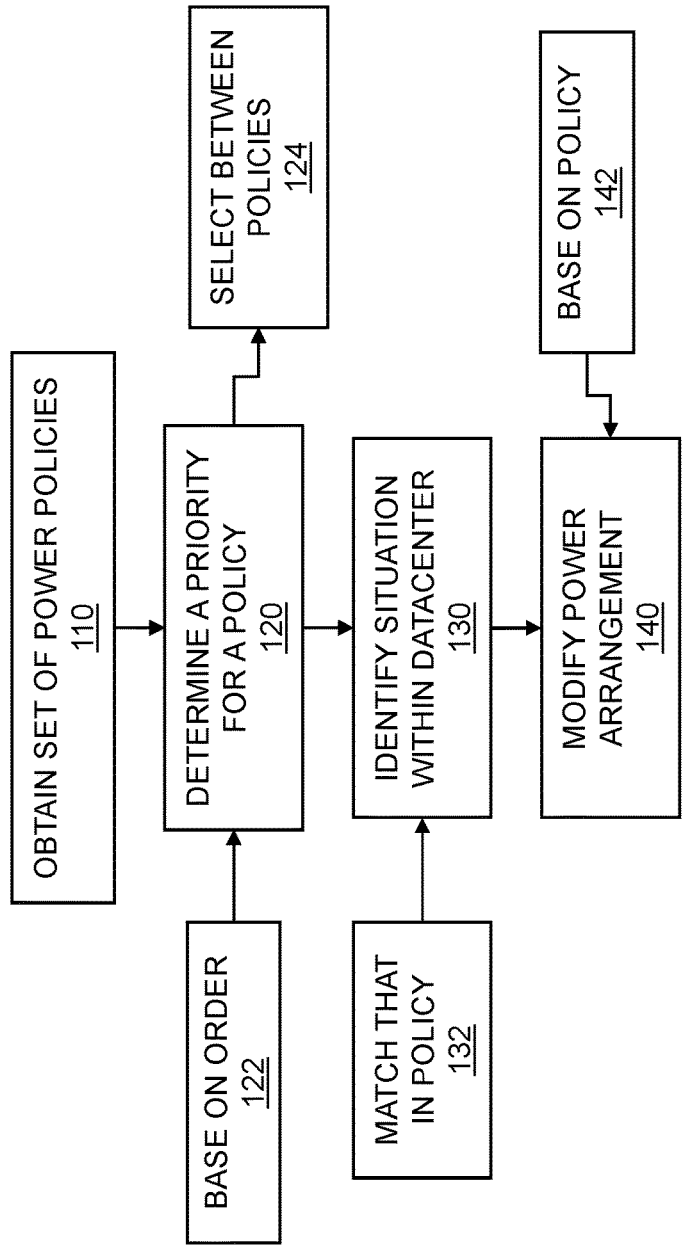
FIG. 1 is a flow diagram for time-varying power management within datacenters.

In disclosed techniques, time-varying power management techniques support power management within datacenters. The datacenters comprise IT infrastructure, such as compute, network, or storage infrastructures. A set of power policies for managing power within a datacenter is obtained. The power policies can be obtained by measurement or calculation of power usage, uploading from a user, downloading from a computer network, and so on. The set of policies can vary over time. A policy can be based on an application running in a portion of the datacenter. A priority for a policy within the set of policies for managing the power within the datacenter is determined. The priority for the policy can be determined by ranking the policy, comparing two or more policies, etc. A situation within the datacenter is identified where the situation matches that described in the policy within the set of policies. A situation can include a mix of processing jobs, a power shortfall, a power surplus, a power failure, and the like. A power arrangement within the datacenter is modified based on the policy within the set of policies. The modifying can include powering a set of loads within the datacenter by a specific power source. The modifying can include changing a topology within the datacenter. The modifying can include powering down a portion of the datacenter, where the powering down can occur after a time duration. The time duration can enable safe shutdown of computers and other processing equipment after a power failure. The modifying can include changing a service level agreement (SLA) support level for power within the datacenter FIG. 1 is a flow diagram for time-varying power management within datacenters. The power requirements of various pieces of IT equipment within a datacenter can change, at times quickly. The amount of power, whether AC power, DC power, or both, that is provided to the IT equipment can be based on available power, available backup power, processing job mix, processing job or virtual machine (VM) scheduling, service level agreement (SLA), and so on. Proper handling of the power requirements can support time-varying power management within a datacenter. The flow 100 shows a processor-implemented method for power management. The flow 100 includes obtaining a set of power policies 110 for managing power within a datacenter. A policy can include a power policy, where the power policy is used to select power sources, to apply power sources to power loads, to configure a power switch, and so on. A power policy can include factors such as time, cost, source availability, source health, etc. A power policy can include additional factors such as local state of power sources, delay (an amount of time) for applying a policy, actions to be taken using the policy, and the like.

The flow 100 includes determining a priority for a policy 120 within the set of policies for managing the power within the datacenter. The priority for the policy can be determined using a variety of techniques. For example, the priority can be determined by computing an objective function, where the objective function can include factors, parameters, etc., such as cost, service level agreement, source availability, and so on. In embodiments, the priority can be based on an order 122 within the set of policies. That is, the first policy within the set of policies can have a highest priority; the second policy within the set of policies can have a next highest priority, and so on. In other embodiments, the priority selects between the policy and a second policy 124 within the set of policies. The policies can be selected based on objective function, service level agreement, customer preference, etc. The priority can be determined based on other factors such as a customer preference for sourcing power from renewable energy sources. In embodiments, the set of policies can vary over time. The policies can include preferences for storing source energy into backup storage when the energy is relatively inexpensive, then using the stored power in the backup storage when the source energy is relatively expensive. As the set of policies can vary over time, the policy within the set of policies can also vary over time. A policy can vary based on whether a preferred energy source or power feed is available, the state of charge (SoC) of local storage (LS), output load handling capabilities, etc.

In embodiments, the policy can apply to the data center's power source. The policy can apply to an amount of power, power source cost, power source availability, power source health, etc. The power source can include various sources of electrical energy. In embodiments, the power source includes a grid power source. The grid power source can include power that is commercially generated from coal, natural gas, hydro, geothermal, and the like. In other embodiments, the power source includes a local power source. The local power source can include backup power from a diesel-generator set, a local grid, and so on. In embodiments, the local power source includes a renewable power source. The renewable power source can be located onsite of a datacenter. In embodiments, the renewable energy source includes one of a solar source, a wind source, a biomass source, a biofuel source, a geothermal source, a hydro source, a tidal energy source, or a wave-motion source. In other embodiments, the policy applies to a situation where communication between a host and a client has been interrupted. The policy can include steps or techniques for continuing to use a policy, discontinuing use of a policy, etc., until communication can be reestablished. The handling of the loss of a communication situation can allow the datacenter to continue operations while communication is being reestablished.

In embodiments, the policy within the set of policies can be a function of time. The policy can be time dependent with respect to a time of day, a day of the week, a day of the month, etc.; can be time dependent with respect to seasonal factors such as hours of daylight, ambient temperature or humidity; and the like. In embodiments, the function of time includes a duration. The duration can be a "time to live" during which a policy is valid, a delay, an amount of time to execute the policy, etc. The function of time can encompass a hold time. A hold time can include the amount of time that power provided to a load is required to remain at a certain level after a power outage. The hold time can include an amount of time sufficient for electrical equipment such as IT equipment to be shut down safely. In embodiments, the policy applies to a section of the datacenter. The section of the datacenter can include one or more information technology (IT) racks, a row of IT racks, a section of IT racks, etc. The section of the datacenter can include a cage in which certain IT equipment can be physically secured. The policy can relate to applications, virtual machines (VMs), and other software that can be executed in the datacenter. In embodiments, the policy can be based on an application running in a portion of the datacenter. The application can include specialty applications such as payroll, search applications, business intelligence (BI) applications, etc.

The flow 100 further includes identifying a situation within the datacenter 130. A situation within a datacenter can include the power need of a piece of electrical equipment, such as a blade server, in excess of what is presently being provided. The situation can include the failure of a piece of equipment such as a data backup or storage unit going offline. The situation in the datacenter can include a power outage. In embodiments, the situation matches that which is described in the policy 132 within the set of policies. The identifying a situation and matching the situation to that in a policy need not be limited to matching one policy. In embodiments, the policy and a second policy both match the situation within the datacenter. The first policy and the second policy can both match the situation, while the first policy and the second policy need not match the needs of the situation exactly. For example, the situation might include a required power level that can be covered by the first policy and the second policy, while the costs of providing the power level, or the sources of power to provide the power level, can differ. Since both policies may not be executed simultaneously, then a selection can be made between the first policy and the second policy. In embodiments, the selection between the first policy and the second policy is based on cost, availability factors, or reliability factors. The availability factors can include whether solar power sources are available (day vs. night), whether wind is blowing for wind power sources, etc. Reliability factors can relate to the "health" of a power source such as whether a power source is due for routine maintenance. In embodiments, the situation can match a portion of the datacenter, such as an IT rack, a row of IT racks, a cluster of IT racks, a cage, and the like.

The flow 100 includes modifying a power arrangement within the datacenter 140. A power arrangement that can be modified can include adding, adjusting, or removing power sources; configuring backup and storage power sources; configuring switches and smart switches within the data center; and the like. In embodiments, the modifying is based on the policy 142 within the set of policies. The policy can be the policy with the highest priority, a policy that matches a situation with lowest cost, etc. In embodiments, the modifying includes powering a set of loads within the datacenter by a specific power source. The power source can include a grid power source, a micro-grid power source, a renewable power source, and the like. In embodiments, the modifying can include changing a topology within the datacenter. The changing the topology can include selecting a power source, or selecting backup power such as UPSs or battery caches. The modifying can include switching an intelligent power switch within the datacenter. In embodiments, the modifying can include powering down a portion of the datacenter. The powering down a portion of the datacenter can include powering down electrical equipment, powering down one or more IT racks, powering down a row of IT racks, powering down a cage, etc. The powering down can occur after a time duration specified in the policy. The time duration can be long enough for electrical equipment such as a blade server to store data, operating system state, process state, and other information, before the blade server is shut down. In embodiments, the modifying can include changing a service level agreement (SLA) support level for power within the datacenter. The SLA can include a static SLA or a dynamic SLA, and so on. In embodiments, the service level agreement can include a variable service level agreement. The modifying can include reliability changes within a variable SLA. The reliability changes can include swapping out power sources based on mean time to failure (MTTF); balancing usage time of power supplies, batteries, or power buffers; and the like. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
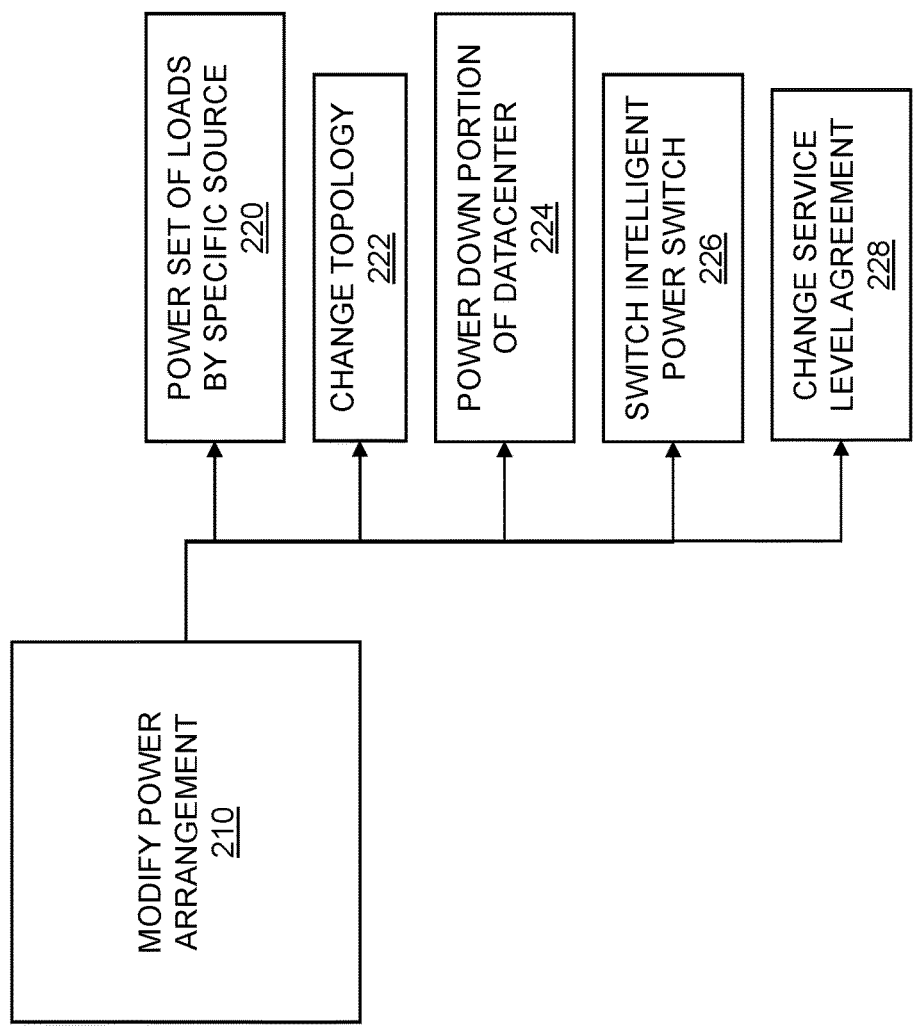
FIG. 2 is a flow diagram for modifying power arrangement.

FIG. 2 is a flow diagram for modifying power arrangements. One or more power arrangements can be modified to support time-varying power management within a datacenter. A set of power policies is obtained and a priority for a policy is determined. The policy within the set of power policies for managing power within a datacenter is determined. A situation within the datacenter is identified, where the situation matches that described in the policy. A situation can include power loads, anticipated power loads, power outage, etc. A power arrangement is modified based on the policy. The flow 200 includes modifying a power arrangement 210 within the datacenter based on the policy within the set of policies. The power arrangement can include choosing power sources and distributing power from those sources to electrical equipment within the datacenter. The power arrangement can include selecting a power source such as grid power, renewable micro-grid power, diesel-generator power, etc.; configuring power switches for distribution of power to data racks within the datacenter; determining whether buffer power such as battery buffer power may be needed to supplement grid power; power distribution unit settings; and so on.

The flow 200 includes powering a set of loads within the datacenter by a specific power source 220. The specific power source can include a feed such as a feed from grid power, a feed from a micro-grid, a backup power source, and the like. The power source can be chosen based on availability, cost, health status, etc. The loads can include a range of electrical equipment including servers, blade servers, communications equipment, backup and storage equipment, etc. The loads can also include electrical equipment that supports datacenter infrastructure such as HVAC equipment. The flow 200 includes changing a topology 222 within the datacenter. The changing the topology can include setting switches to select a power source; setting switches to charge batteries, connect batteries, or bypass batteries; setting switches to select a power distribution unit or to select power loads; and the like. The flow 200 includes powering down a portion of the datacenter 224. The portions of the datacenter can include one or more items of electrical equipment within a data rack, all equipment in one or more data racks, equipment in a cage within a datacenter, etc. In embodiments, the powering down can occur after a time duration which has been specified in the policy. The time duration can include a number of milliseconds, seconds, minutes, etc.

The flow 200 includes switching an intelligent power switch 226 within the datacenter. The switching of an intelligent power switch can be based on a policy for the switch. As discussed elsewhere, the intelligent switch can be used to select between or among a plurality of power sources such as grid power, renewable micro-grid power, backup power sources such as a diesel-generator set, and so on. The intelligent switch can be used to control a UPS such as a datacenter central UPS or a battery bank. The controlling the UPS or battery bank can include bypassing the UPS or battery bank, charging the batteries, drawing power from the batteries, and the like. The intelligent switch can be used to switch power distribution units (PDUs). The flow 200 includes changing a service level agreement 228 support level for power within the datacenter. A service level agreement (SLA) can be used to describe levels of power availability such as numbers of power outages for a given time period such as a year, durations of power outages, frequency of power outages, and so on. The SLA can include a level of computational performance based on a priority or other criterion. In embodiments, the service level agreement can include a variable service level agreement. A variable service level agreement can be based on energy cost, power source availability, customer priority, processing job priority, etc.

Figure 3:
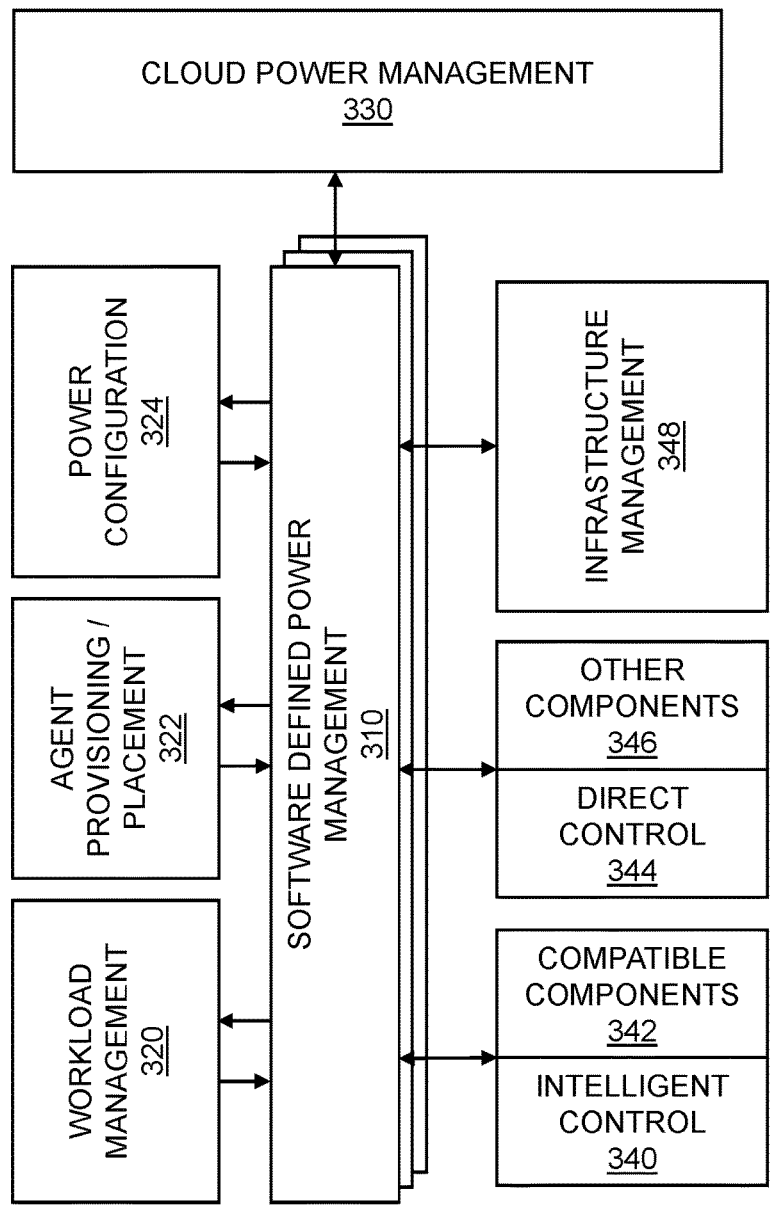
FIG. 3 is a block diagram for time-variant software defined power.

FIG. 3 is a block diagram for time-variant software defined power. Software defined power (SDP) can be used to match power sources such as grid power or renewable micro-grid power, uninterruptable power supplies (UPSs), backup power such as diesel-generator (DG) sets or batteries, and so on, to power requirements of equipment such as electrical equipment and cooling equipment in datacenters. The software defined power can adapt power configurations and power allocations dynamically as equipment, processing, service level agreements, and other needs change. Power configurations can be adapted to capture underutilized power from some portions of a datacenter, and to provide that captured power to other portions of the datacenter. Software defined power can support time-varying power management within datacenters. A set of power policies is obtained and a priority for a policy within the set of policies for managing the power within the datacenter is determined. A situation within the datacenter is identified, where the situation matches that described in the policy. A power arrangement within the datacenter is modified based on the policy.

The block diagram 300 includes software defined power management 310. The software defined power management can use various techniques to determine various power requirements, to allocate power, to anticipate power requirements, and so on. The techniques that can be used by the software defined power management block can include predictive analytics to predict power needs based on historical and current power use. The management block can use intelligent power prediction to anticipate power needs based on current power use and can include other usage information such as anticipated client usage, processing job mix, seasonal factors such as lighting and cooling, and so on. Anticipated client usage can include considerations such as running payroll every month on a given date, and the like.

The software defined power management 310 block can be in communication with other blocks. In embodiments, the management block can communicate with workload management 320. Workload management can include orchestrating the workload of processing tasks by scheduling the processing tasks and by placing the tasks on processors within the datacenter. Communication between power management and workload management can include power management sending power availability information to workload management, and receiving power policies and power configurations. Power management can be in communication with agent provisioning and placement 322. A virtual machine can include an instance of an operating system, an instance of an application, an agent based on a data flow graph, and so on. The agent provisioning and placement can be based on using a hypervisor or virtual machine monitor (VMM). Power availability information can be sent from power management to agent provisioning and placement, while power policies and power configurations in support of the agent provisioning and placement can be returned.

Power management can be in communication with power configuration 324. Power configuration can receive power availability information and can return power policies and configurations. The power policies and configurations can be used to manage power distribution systems within the datacenter. The power configuration can be based on power topology, visualization based on power availability, power configurations, and so on. Power management can be in communication with cloud power management 330. Cloud power management can include datacenter power management of remote datacenters; cross-datacenter power configuration and workload orchestration; machine learning for power configuration, where the machine learning can be based on cross-datacenter knowledge; accelerated simulations of power arrangements within a datacenter and across datacenters; and the use of hardware-as-a-service (HaaS) platforms.

Power management can communicate with equipment within the datacenter in order to manage that equipment. The communication can include connecting to the various items of electrical equipment; collecting status, state, and other data from the electrical equipment; and controlling the electrical equipment. The electrical equipment can include processors, servers, communication equipment, backup and storage; power distribution equipment; cooling equipment, etc. The type of equipment and the capabilities of the equipment to be controlled can determine the level of control by power management of the equipment. Some equipment within the datacenter can be controlled by policies that can be loaded onto the equipment. This equipment can support intelligent control 340. Equipment that can be controlled locally using intelligent control can include compatible components 342, where the compatible components can include compatible power distribution units (PDUs), compatible uninterruptable power supplies (UPSs), compatible electrical distribution switch gear, etc. Other equipment or components within the datacenter cannot be controlled locally using intelligent control, but rather can be controlled centrally by power management. This latter type of equipment can support direct control 344. These other components 346 can include other PDUs, other UPSs, other switch gear, and so on. Further equipment within the datacenter can be controlled by power management. This further equipment can comprise infrastructure management 348, where infrastructure management can include HVAC management, facilities management, IT server management, and so on.

FIG. 4A illustrates example power policies 400 for 2N redundancy. Power policies, such as power policies for 2N redundancy, are used for time-varying power management within datacenters. A set of power policies for managing power within a datacenter is obtained. A priority for a policy within the set of policies is determined for managing the power within the datacenter. A situation within the datacenter is identified where the situation matches that described in the policy within the set of policies. A power arrangement within the datacenter is modified based on the policy within the set of policies.

A policy can define a set of conditions within a datacenter. The conditions can be based on a local state 410 of various pieces of electrical equipment, where the electrical equipment can include servers; communications equipment; backup and storage equipment; data racks; information technology racks; heating, cooling, air conditioning (HVAC) equipment; and so on. The various pieces of electrical equipment can include power equipment such as power feeds, power loads, switches, etc. The conditions of devices within the datacenter are checked periodically. The states of the local devices can be compared to a situation, where the comparison can match the datacenter situation to that described in a policy. The local state can include a disconnect time during which a policy can remain valid; status available (1) or unavailable (0) of a feed line feed A, feed B, or feed C; and a state of charge (SoC) of local storage (LS) as a percentage of maximum charge. Delay 412 can be introduced into a policy. A delay can be used to prevent policy "thrashing", where policy thrashing could result from a changing state variable causing changes in policy application. Instead, a policy can be assigned and a delay can be loaded into a countdown timer. The countdown can be based on a threshold. Once the threshold is reached, the countdown timer may not be reset based on a change in state. A policy can include actions that can be taken. When a match between a situation in a datacenter and the situation described in a policy is found, one or more actions 414 can be performed. The actions taken can include closing (1) or opening (0) an output relay for an output A'; or opening or closing an output relay for an output B'. The actions described in a policy can include limits imposed on the outputs A' and B' such as limit A and limit B. The actions also can include defining an amount of power that can be pulled (a negative value) from or pushed (a positive value) to a feed such as feed C. The feeds can include AC power or DC power.

Policies that can support 2N redundancy are shown. The policies can include policy 1 420, policy 2 422, policy 3 424, policy 4 426, policy 5 428, and so on. While five policies (policy 1 through policy 5) are shown, other numbers of policies can be included. The policies can be ranked. In embodiments, the policies are ranked based on priority, where a priority can be determined for a policy within a set of policies for managing power within the datacenter. When a situation within the datacenter is identified that can match the situation described in two or more policies, then the first policy can be selected for execution.

FIG. 4B illustrates example power policies for 1N redundancy. Power policies, including power policies that support 1N redundancy, support time-varying power management within datacenters. As discussed elsewhere, a policy can be used to define parameters for states of electrical equipment within a datacenter. The policy can also describe actions to be taken based on the state of the electrical equipment. Example policies for 1N redundancy 402 are shown. Each policy can include fields for local state 430, delay 432, actions 434, and so on. The local state can include disconnect time which can include a number of seconds since a previous policy was updated. A policy with a non-zero disconnect time can only be considered for use if a new policy has not been received in the specified duration of time such as a number of seconds. The local state can include a status available/unavailable (1/0 respectively) for feed A, available/unavailable for feed B or feed C, a state of charge (SoC) for local storage as a percentage, and the like.

In embodiments, a certain action can be performed if a local state persists for an amount of time. A technique that can be used to support state persistence can include defining a delay 432 that can apply to a policy rule. The delay can be used to initiate a countdown timer. A reset threshold can be applied to the countdown timer. A countdown towards a particular action may continue when a local state changes, instead of being interrupted by the local state change, based on the reset threshold. The countdown time can be reset if a local state changes and the reset threshold has not been reached. The countdown timer continues to count down interrupted once the reset threshold is met. In embodiments, various actions 434 can be taken for a given policy. The actions can include closing (1) or opening (0) an output relay for an output A', closing or opening an output relay for an output B', limiting an output A based on power capacity of output A, limiting output B based on power capacity of output B, or defining an amount of power that can be pulled from (a negative value) or pushed to (a positive value) feed C. A plurality of policies can be included. The plurality of policies can include policy 1 440, policy 2 442, policy 3 444, policy 4 446, policy 5 448, policy 6 450, and so on. While six policies are shown, other numbers of policies can be used to support 1N redundancy. The order of policies can be significant, where the order of policies can indicate ranked priorities for the policies. The rankings of the policies can be based on cost, availability, service level agreement, priority, and so on.

Figure 5:
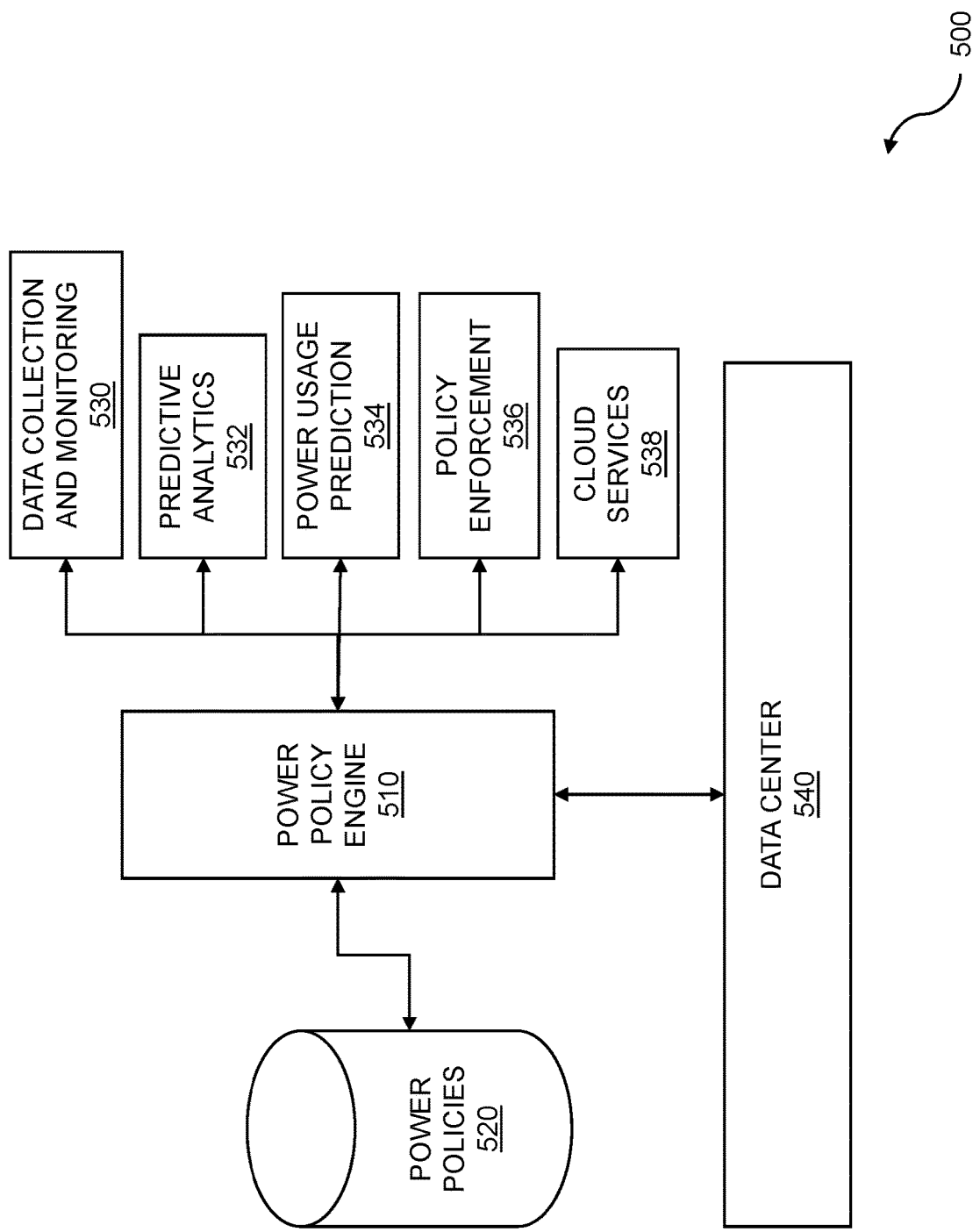
FIG. 5 shows processing of software defined power policies.

FIG. 5 shows processing of software defined power policies. Software defined power can be based on collecting and analyzing datacenter operations data. The datacenter operations data can include power data such as power source data and power load requirement data. The operations data can include operating policies, allocation policies, service level agreements (SLAs) and so on. Software defined power policies support time-varying power management within datacenters. A set of power policies for managing power within a datacenter is obtained, and a priority for a policy within the set of policies is determined. A situation within the datacenter is identified where the situation matches that described in the policy, and a power arrangement within the datacenter is modified based on the policy.

Software defined policies are processed 500 for managing power within a data center. A datacenter 540 can be managed using time-varying techniques by a power policy engine 510. The power policy engine can include one or more processors, servers, blade servers, cloud servers, and so on. The one or more processors or one or more servers can be located within the datacenter, remotely from the datacenter, in the "cloud", and the like. The power policy engine 510 can access power policies 520. The power polices can include one or more of power arrangements, power configurations, service level agreements, dynamic service level agreements, and so on. The allocation policies can be stored in a networked database, where the networked database can include a structured query language (SQL) database. The allocation policies can include power source limits, such as grid power limits, renewable micro-grid power limits, power source availability, and so on. The power policies, including allocation or arrangement policies, can include criteria such as power consumption limits, switch configurations, datacenter condition criteria, etc. In a usage example, when conditions that allow peak shaving to take place and when surplus power exists, the power policies can identify datacenter switches and configurations for those switches to allow replenishing of the power caches or other backup power.

The identifying of datacenter situations, the determining of policy priorities, and the modifying of power arrangements, etc., can be performed by the power policy engine based on several techniques. The techniques can be time-varying. The power policy engine can use data collection and monitoring 530. Data collection and monitoring can include power source availability, power load needs, power component operating health, and so on. The data collection and monitoring can occur at the electrical equipment level where the electrical equipment can include servers, switches, uninterruptable power supplies (UPSs), batteries, etc. The data collection and monitoring can occur at the data rack (IT rack) level, for a cluster of racks, for a cage, etc. The power policy engine can use predictive analytics 532. The predictive analytics can use data obtained from the datacenter as the datacenter is in operation, as well as historical data, to determine power usage trends. The predictive analytics can be used to generate a value related to each power source, power load, switch, etc., where the value can be a score, a percentage, and so on. The predictive analytics can be used to determine trends in power usage.

The power policy engine can use power usage prediction 534. The power usage prediction can be based on historical power usage or present power usage, and can include other usage information such as anticipated client usage, processing job mix, seasonal factors such as lighting and cooling, and so on. The power policy engine can use policy enforcement 536. Policy enforcement can be based on a service level agreement, a variable SLA, a dynamic SLA, etc. The policy enforcement can be used to provide power required by the SLA to throttle down power to datacenter equipment such as datacenter racks when higher priority jobs or SLAs are encountered, and the like. The power policy engine can use cloud services 538. Cloud services can include storage services for storing power policies, as described elsewhere. The cloud services can include determining or identifying services, where the determining a priority or identifying a situation can be performed in the cloud using cloud-based servers, and so on.

Figure 6:
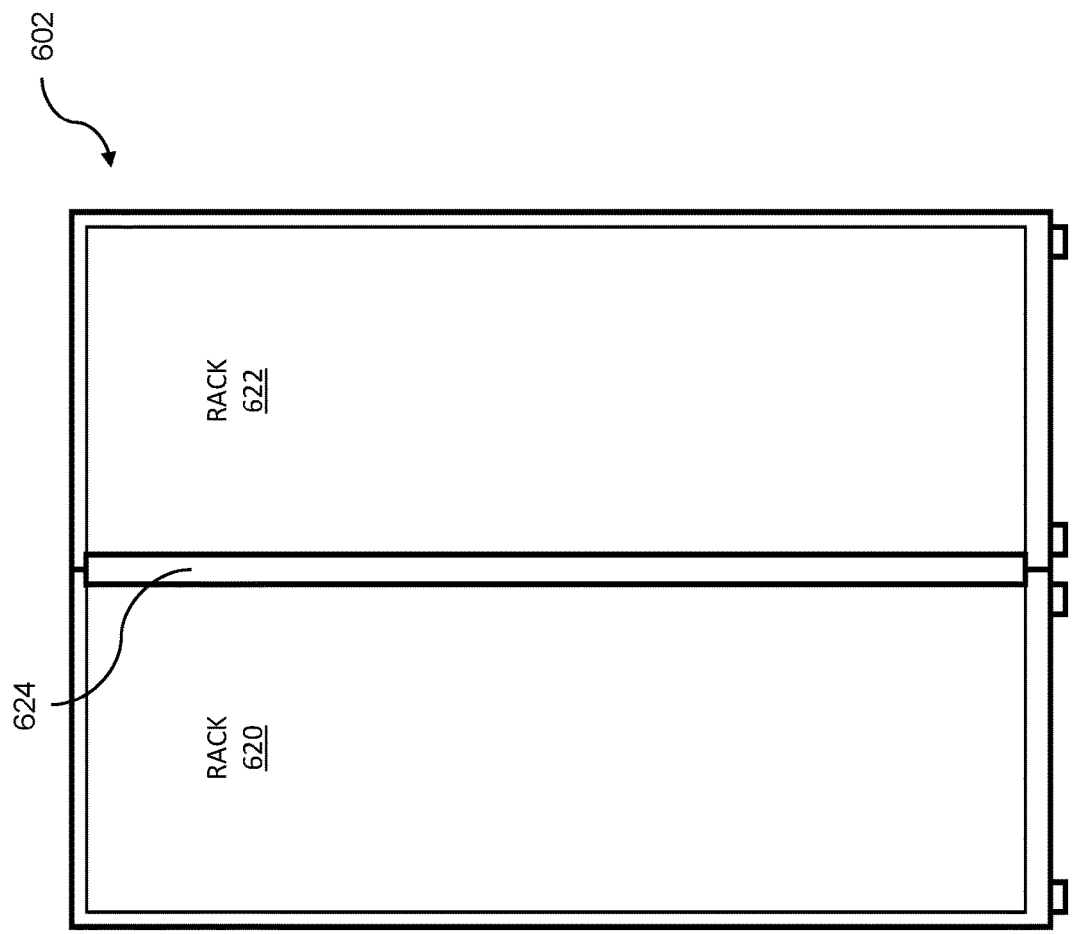
FIG. 6 shows example rack and power configurations.
Figure 6:
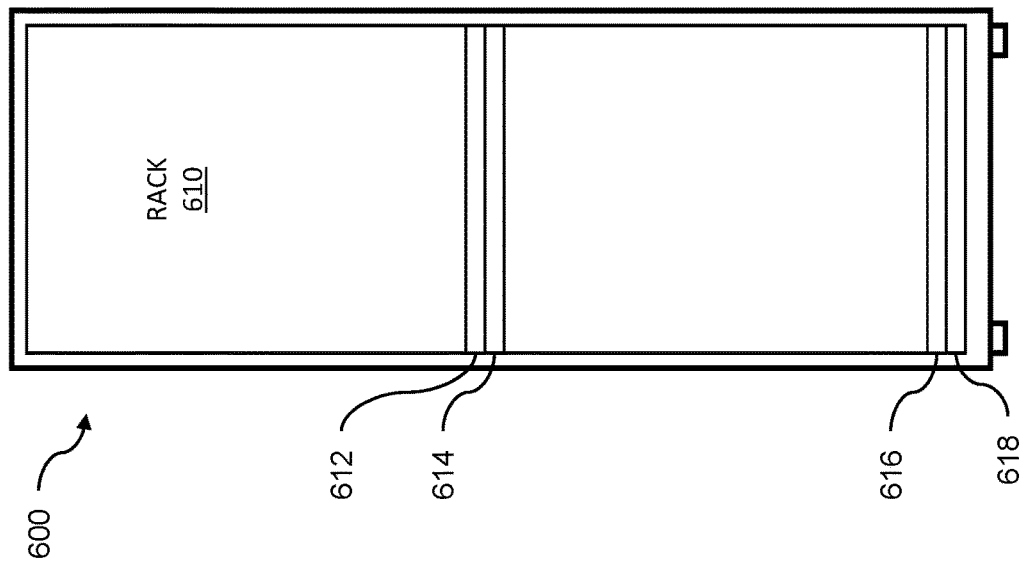

FIG. 6 shows example rack and power configurations. Data racks or information technology (IT) racks can contain computing equipment, communication equipment, storage and backup equipment, and other electrical equipment. The electrical equipment can include power supplies, batteries, uninterruptable power supplies, and so on. The electrical equipment within the data racks can be powered and controlled based on time-varying power management within datacenters. A set of power policies is obtained and a priority for a policy is determined. The set of policies is used for managing the power within the datacenter. A situation within the datacenter is identified where the situation matches that described in the policy. A power arrangement within the datacenter is modified based on the policy. The figure shows two example rack and power configurations, a first configuration 600, and a second configuration 602. One or more batteries, one or more power supplies, a plurality of connectors, a plurality of power sensors, a plurality of load sensors, and controllers can comprise a consolidated rack mount power system. An example system is shown in the first configuration 600 which includes rack 610, in turn composed of consolidated rack mount power systems 612, 614, 616, and 618. The one or more batteries, the plurality of power supplies, the plurality of connectors, the plurality of power sensors, the plurality of load sensors, the plurality of converters, and the controllers can comprise a consolidated side mount power system. An example setup is shown in the second configuration 602 which includes a first rack 620 and a second rack 622, together composing a consolidated side mount power system 624 placed between the first rack 620 and the second rack 622. The consolidated rack mount power system and the consolidated side mount power system can be stackable. For example, consolidated rack mount power systems 612 and 614 are stacked one on top of the other in adjacent rack spaces. The rack mount power systems can be evaluated and connected to the various electrical components contained with the racks 610, 620, and 622. The evaluating and connecting the AC and DC power sources, and the controlling the power sources, can be accomplished using a software-defined power infrastructure. In embodiments, the software-defined power infrastructure can control the evaluating and the connecting in a dynamic manner.

The stacking can provide for N+ parallelization. N+ parallelization refers to a number of additional power supplies beyond the required number which are kept as standby or reserve power supplies. For example, if a particular cluster of racks requires six power supplies, an N+1 configuration would provide seven power supplies, an N+2 configuration would provide eight power supplies, and so on. The stacking can also provide for 2N parallelization. Again, using the example of six required power supplies, a 2N parallelization scheme would provide twelve power supplies. In the 2N redundancy configuration, any critical path in the power system is replicated to remove single points of failure and to increase robustness. The consolidated side mount power system can also provide power across multiple racks. For example, a single consolidated side mount power system 624 can provide power across a first rack 620 and a second rack 622.

Figure 7:
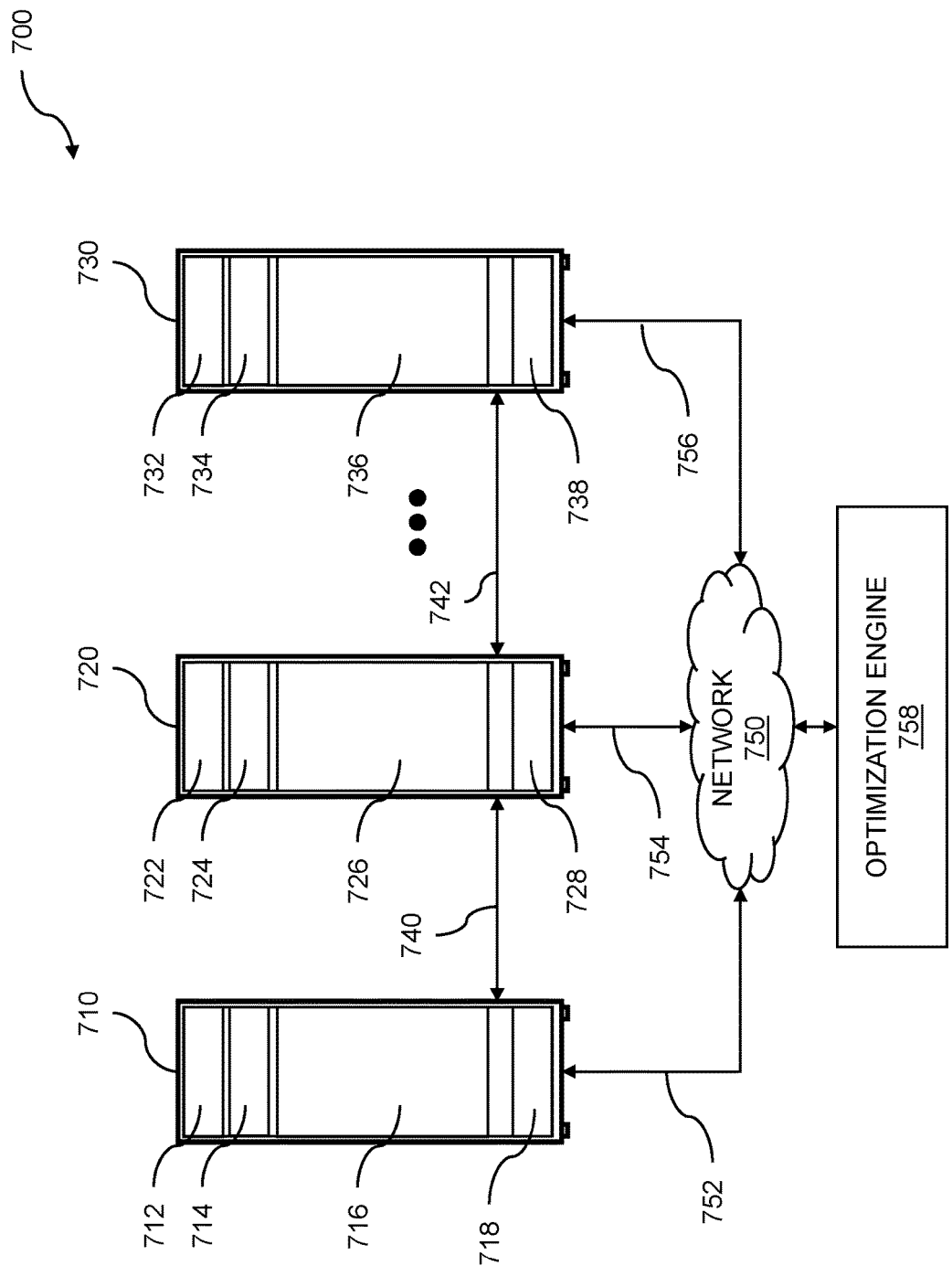
FIG. 7 shows a datacenter rack configuration.

FIG. 7 shows a datacenter rack configuration. Data racks, also called information technology (IT) racks, contain a variety of electrical equipment for which power is controlled. A datacenter can include multiple IT racks which can be powered and controlled based on time-varying power management within the datacenter. A set of power policies for managing power within a datacenter is obtained, and a priority for a policy within the set of policies for managing the power is determined. A situation within the datacenter is identified where the situation matches that described in the policy within the set of policies. The set of policies varies over time, and the policy within the set of policies varies over time. A power arrangement within the datacenter is modified based on the policy within the set of policies.

A datacenter can include multiple data racks. Example 700 includes three data racks, indicated as rack 710, rack 720, and rack 730. While three data racks are shown in example 700, in practice, there can be more or fewer data racks. The data rack 710 includes a power cache 712, a first server 714, a second server 716, and a power supply 718. The power supply 718 can be used for AC-DC conversion and/or filtering of power to be used by the servers 714 and 716, as well as replenishment of the power cache 712. In embodiments, the power cache 712 includes an array of rechargeable batteries. In embodiments, the batteries include, but are not limited to, lead-acid, nickel metal hydride, lithium ion, nickel cadmium, and/or lithium ion polymer batteries. Similarly, the data rack 720 includes a power cache 722, a first server 724, a second server 726, and a power supply 728. Furthermore, the data rack 730 includes a power cache 732, a first server 734, a second server 736, and a power supply 738. The data racks are interconnected by communication links 740 and 742. The communication links can be part of a local area network (LAN). In embodiments, the communication links include a wired Ethernet, Gigabit Ethernet, or another suitable communication link. The communication links enable each data rack to send and/or broadcast current power usage, operating conditions, and/or estimated power requirements to other data racks and/or upstream controllers such as a cluster controller. Thus, in the example 700, a power cache can be located on each of the multiple data racks within the data center. In embodiments, the power cache includes multiple batteries spread across the multiple data racks.

Each rack may be connected to a communication network 750. Rack 710 is connected to network 750 via communication link 752. Rack 720 is connected to network 750 via communication link 754. Rack 730 is connected to network 750 via communication link 756. The optimization engine 758 can retrieve operating parameters from each rack. In embodiments, the operating parameters are retrieved via SNMP (Simple Network Management Protocol), TR069, or other suitable protocol for reading information. Within a Management Information Base (MIB), various Object Identifiers (OIDs) may be defined for parameters such as instantaneous power consumption, average power consumption, number of cores in use, number of applications currently executing on a server, the mode of each application (suspended, running, etc.), internal temperature of each server and/or hard disk, and fan speed. Other parameters may also be represented within the MIB. Using the information from the MIB, the optimization engine 758 may derive a new dispatch strategy in order to achieve a power management goal. Thus, embodiments include performing the optimizing with an optimization engine.

Figure 8:
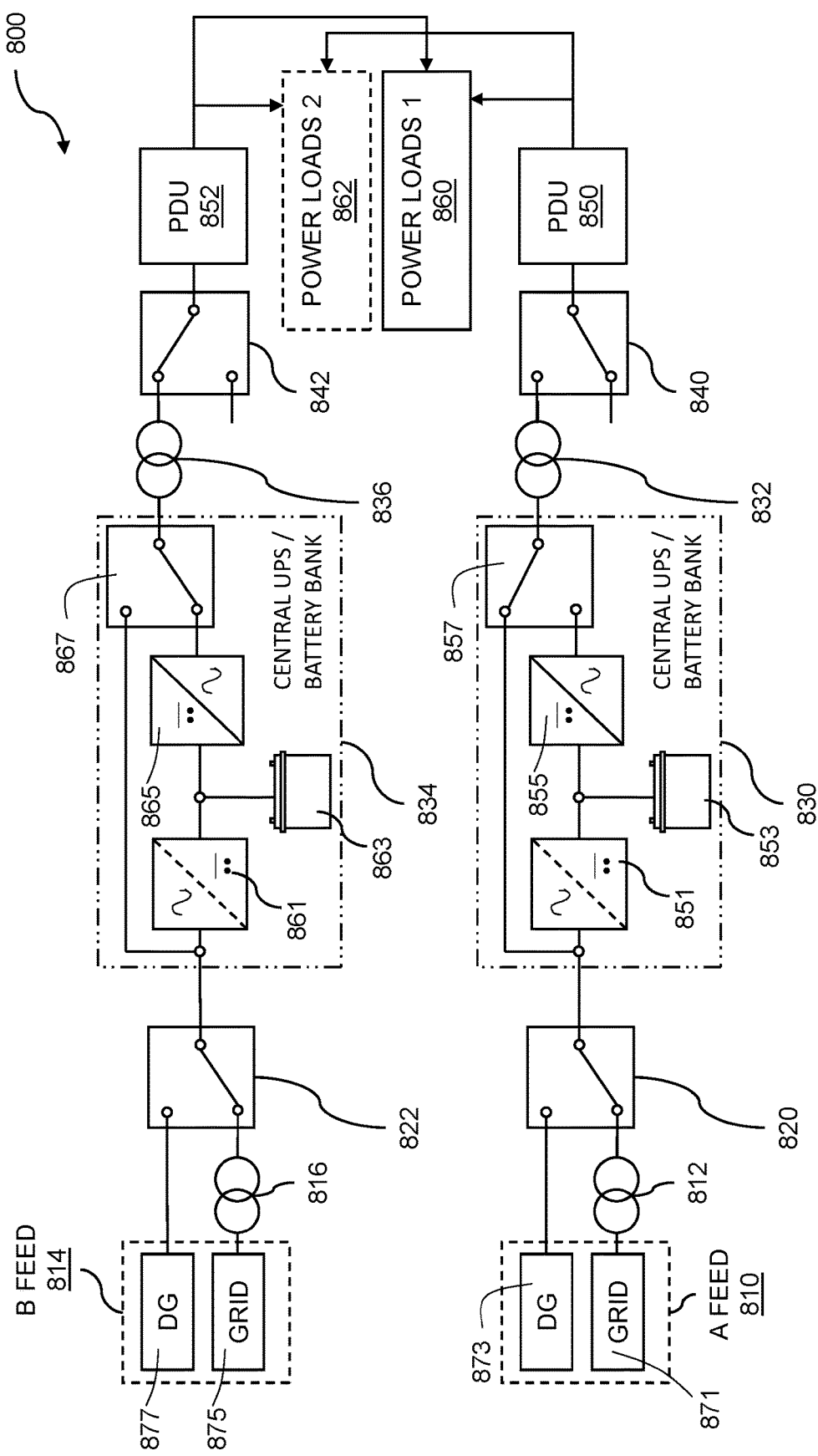
FIG. 8 shows a topology representation with multiple sets.

FIG. 8 shows a topology representation with multiple sets. Power, physical space, cooling, security, and other critical resources of a datacenter can be allocated and configured based on time-varying power management within datacenters. A set of power policies for managing power within a datacenter is obtained. A priority for a policy within the set of policies is determined for managing the power within the datacenter. A situation within the datacenter is identified, where the situation matches that described in the policy within the set of policies. A power arrangement within the datacenter is modified based on the policy within the set of policies.

The topology representation 800 includes a first main power source 810, referred to as the "A feed." The topology representation 800 further includes a second main power source 814, referred to as the "B feed." Each feed is capable of powering each device in the datacenter simultaneously. This configuration is referred to as 2N redundancy for power. The A feed 810 includes a grid source 871, and a secondary, local source of a diesel generator (DG) 873. The grid source 871 is input to a power regulator 812 and then into one input of a switch block 820. The diesel generator 873 is connected to a second input of the switch block 820. The switch block 820 can be configured, by arrangement of a power policy, to select the diesel generator source or the grid source. The switch block 820 feeds into an uninterruptable power supply (UPS) 830. The UPS 830 includes an AC-DC converter 851 configured to charge a power cache 853. In embodiments, the power cache 853 is a battery. The UPS 830 further includes a DC-AC converter 855 that feeds into an input of a switch block 857. The output of the switch block 820 feeds into a second input of the switch block 857. The output of the UPS 830 is input to a power regulator 832, and then to an input of a switch block 840. The switch block 857 can be configured, based on a power policy, to provide power from the power cache, or to bypass the power cache and provide power directly from the local or grid power source. The second input of the switch block 840 is not connected, such that if the second input is selected, the A feed 810 is disconnected from the PDU 850. The PDU (Power Distribution Unit) distributes power within a datacenter and feeds the power loads 860 within the datacenter. In embodiments, a second set of power loads 862 may be added as part of a simulation of a dynamic power scenario. A controller (not shown) can control the PDU 850. The controller can be an intelligent power controller. The controller can receive a power policy for use in the datacenter. The controller can use a key. The key can be used to support secure communications to and from the controller. The key can be uploaded by a user, downloaded from the internet, embedded in the controller, and so on.

Similarly, the B feed 814 includes a grid source 875, and a secondary, local source of a diesel generator (DG) 877. The grid source 875 is input to a power regulator 816 and then into one input of a switch block 822. The diesel generator 877 is input to a second input of the switch block 822. The switch block 822 can be configured, based on a power policy, to select the diesel generator source or the grid source. The switch block 822 feeds into a UPS 834. The UPS 834 includes an AC-DC converter 861 configured to a charge power cache 863. In embodiments, power cache 863 may be a battery. The UPS 834 further includes a DC-AC converter 865 that feeds into an input of a switch block 867. The output of the switch block 822 feeds into a second input of a switch block 867. The switch block 867 can be configured, based on a power policy, to provide power from the power cache, or to bypass the power cache and provide power directly from the local or grid power source. The output of the UPS 834 is input to a power regulator 836, and then to an input of a switch block 842. The second input of the switch block 842 is not connected, such that if the second input is selected, the B feed 814 is disconnected from the PDU 852 which in turn feeds the first set of power loads 860 and/or the second set of power loads 862 within the datacenter. A controller (not shown) can control the PDU 852. The controller can receive a power policy for use in the datacenter. The controller can use a key. The key can be used to support secure communications to and from the controller. The key can be uploaded by a user, downloaded from the internet, embedded in the controller, and so on.

Thus, the A feed 810 and the B feed 814 comprise a first main power source and a second main power source. The power source and the second power source can provide 2N redundancy to the power load. Furthermore, in embodiments, the power source and a second power source share power to the multiple data racks, wherein the power is shared on a fractional basis. A variety of dynamic power scenarios can be simulated based on the topology shown in FIG. 8.

Figure 9:
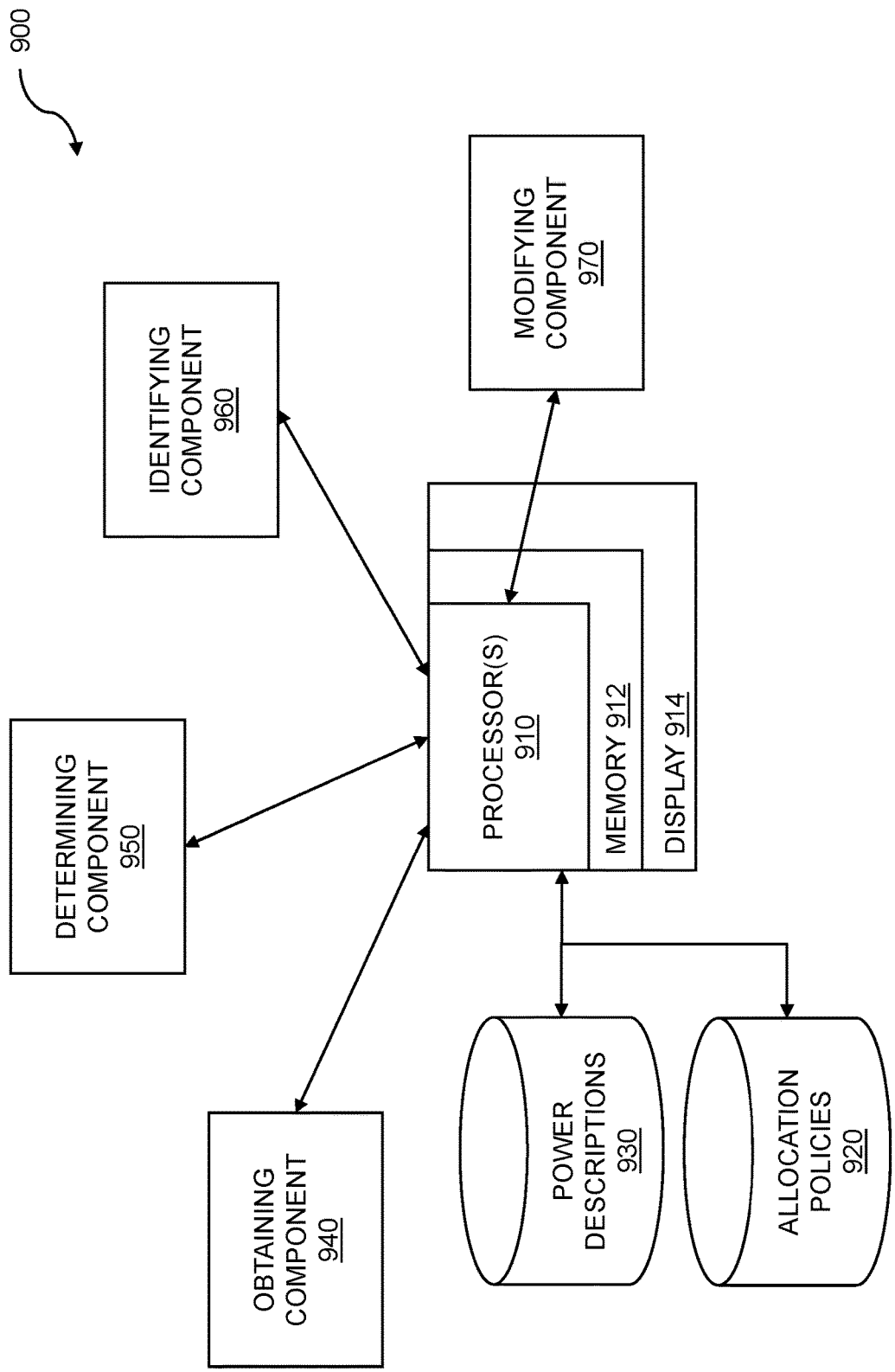
FIG. 9 shows a system diagram for time-varying power management within datacenters.

FIG. 9 shows a system diagram for time-varying power management within datacenters. A set of power policies for managing power within a datacenter is obtained. A priority for a policy within the set of policies for managing the power within the datacenter is determined. A situation within the datacenter is identified where the situation matches that described in the policy within the set of policies. A power arrangement within the datacenter is modified based on the policy within the set of policies. The set of policies varies over time, and the policy with the set of policies varies over time. The priority is based on an order within the set of policies.

The system 900 can include one or more processors 910 and a memory 912 which stores instructions. The memory 912 is coupled to the one or more processors 910, wherein the one or more processors 910 can execute instructions stored in the memory 912. The memory 912 can be used for storing the following: instructions; databases of power sources, power caches and power loads; information pertaining to load requirements or redundancy requirements; power policies; and/or service level agreements (SLAs). The memory can also be used for system support. Information regarding time-varying power management within datacenters can be shown on a display 914 connected to the one or more processors 910. The display can comprise a television monitor, a projector, a computer monitor (including a laptop screen, a tablet screen, a netbook screen, and the like), a smartphone display, a mobile device, or another electronic display.

The system 900 includes allocation policies 920. The allocation polices can include service level agreements, dynamic service level agreements, and so on. In embodiments, the allocation policies 920 are stored in a networked database, such as a structured query language (SQL) database. The allocation policies 920 can include limits, such as power consumption limits, as well as switch configurations when certain conditions are met. For example, when conditions allow peak shaving to take place, and surplus power exists, the power policies can identify switches and their configurations to allow replenishing of the power caches. The system 900 further includes a repository of power descriptions 930. The power descriptions 930 can include, but are not limited to, power descriptions of power loads, power caches, power supplies, rack power profiles, batteries, buses, circuit breakers, fuses, and the like. The power descriptions can include physical space needs, electrical equipment cooling requirements, etc. The system 900 includes an obtaining component 940. The obtaining component 940 can be used for obtaining a set of power policies for managing power within a datacenter. The power policies can be based on available power sources such as grid power, diesel-generator power, alternative energy sources, or renewable energy sources; battery backup capabilities; and so on.

The system 900 includes a determining component 950. The determining component 950 is configured to determine a priority for a policy within the set of policies for managing the power within the datacenter. The priority can be determined based on various criteria. In embodiments, the priority is based on an order within the set of policies. The priority can be used for selecting. In embodiments, the priority selects between a first policy and a second policy within the set of policies. The determining can be performed on computing equipment such as a local server, a remote server, a cloud-based server, a mesh server, and the like. The system 900 includes an identifying component 960. The identifying component 960 can identify a situation within the datacenter where the situation matches that described in the policy within the set of policies. The situation can match a portion of the datacenter, such as one or more information technology (IT) racks, a cage, and so on. The situation can include power loads, power source configurations, backup power, and the like. The situation can include job mix, scheduling factors such as running payroll, seasonal factors, etc. The situation can include datacenter events such as a power outage, equipment failure, etc. The system 900 includes a modifying component 970. The modifying component 970 can modify a power arrangement within the datacenter based on the policy within the set of policies. The power arrangement can include a power configuration, a power topology, etc. The power arrangement can be based on a service level agreement. The power arrangement, which can be based on a policy, can be based on cost, availability factors, or reliability factors. The power arrangement can be time dependent.

Disclosed embodiments can include a computer program product embodied in a non-transitory computer readable medium for power management, the computer program product comprising code which causes one or more processors to perform operations of: obtaining a set of power policies for managing power within a datacenter; determining a priority for a policy within the set of policies for managing the power within the datacenter; identifying a situation within the datacenter where the situation matches that described in the policy within the set of policies; and modifying a power arrangement within the datacenter based on the policy within the set of policies.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"— may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for power management comprising:

obtaining a set of power policies for managing power within a datacenter;

determining a priority for a policy within the set of policies to accomplish time-varying power management of the power within the datacenter;

identifying a situation within the datacenter where the situation matches that described in the policy within the set of policies; and modifying a power arrangement within the datacenter based on the policy within the set of policies.

2. The method of claim 1 wherein the set of policies varies over time.

3. The method of claim 1 wherein the policy within the set of policies varies over time.

4. The method of claim 1 wherein the policy within the set of policies is a function of time.

5. The method of claim 4 wherein the function of time includes a duration.

6. The method of claim 5 wherein the function of time includes a hold time.

7. The method of claim 4 wherein the policy applies to a section of the datacenter.

8. The method of claim 4 wherein the policy is based on an application running in a portion of the datacenter.

9. The method of claim 1 wherein the priority is based on an order within the set of policies.

10. The method of claim 1 wherein the priority selects between the policy and a second policy within the set of policies, and wherein the priority is determined by computing an objective function.

11. The method of claim 10 wherein the policy and the second policy both match the situation within the datacenter.

12. The method of claim 10 wherein selection between the policy and the second policy is based on cost, availability factors, or reliability factors.

13. The method of claim 1 wherein the situation matches a portion of the datacenter.

14. The method of claim 1 wherein the modifying includes powering a set of loads within the datacenter by a specific power source.

15. The method of claim 1 wherein the modifying includes changing a topology within the datacenter.

16. The method of claim 1 wherein the modifying includes powering down a portion of the datacenter.

17. The method of claim 16 wherein the powering down occurs after a time duration specified in the policy.

18. The method of claim 1 wherein the modifying includes switching an intelligent power switch within the datacenter.

19. The method of claim 1 wherein the modifying includes changing a service level agreement support level for power within the datacenter.

20. The method of claim 19 wherein the service level agreement includes a variable service level agreement.

21. The method of claim 1 wherein the policy applies to a situation where communication between a host and a client has been interrupted.

22. The method of claim 1 wherein the policy is used for choosing a power source to distribute power to electrical equipment within the datacenter.

23. The method of claim 17 wherein the power source includes a grid power source.

24. The method of claim 17 wherein the power source includes a local power source.

25. The method of claim 24 wherein the local power source includes a renewable power source.

26. The method of claim 1 wherein the set of policies is used to select power sources, to apply power sources to power loads, or to configure a power switch.

27. The method of claim 1 wherein the situation includes failure of a piece of equipment or a power outage.

28. A computer program product embodied in a non-transitory computer readable medium for power management, the computer program product comprising code which causes one or more processors to perform operations of:
    obtaining a set of power policies for managing power within a datacenter;
    determining a priority for a policy within the set of policies to accomplish time-varying power management of the power within the datacenter;
    identifying a situation within the datacenter where the situation matches that described in the policy within the set of policies; and
    modifying a power arrangement within the datacenter based on the policy within the set of policies.

29. A computer system for power management comprising:
    a memory which stores instructions;
    one or more processors attached to the memory wherein the one or more processors, when executing the instructions which are stored, are configured to:
        obtain a set of power policies for managing power within a datacenter;
        determine a priority for a policy within the set of policies to accomplish time-varying power management of the power within the datacenter;
        identify a situation within the datacenter where the situation matches that described in the policy within the set of policies; and
        modify a power arrangement within the datacenter based on the policy within the set of policies.

* * * * *